Jan. 28, 1941.  H. McCANN ET AL  2,229,756
DELIVERY DEVICE FOR BICYCLES OR MOTORCYCLES
Filed Sept. 29, 1939
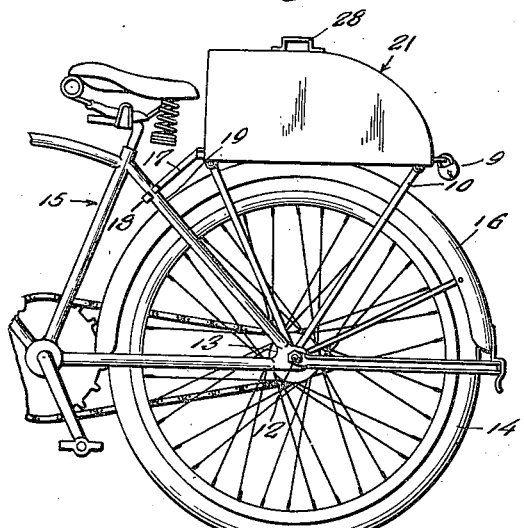
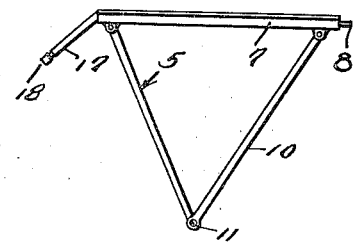
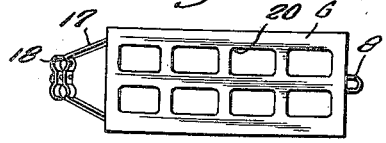
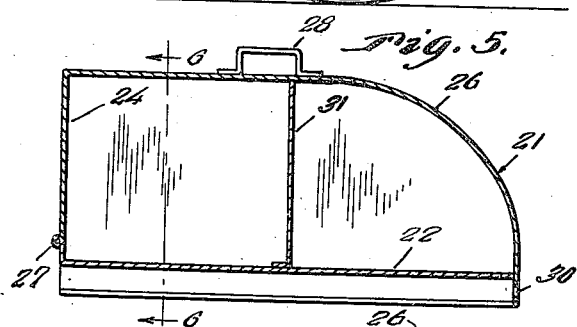
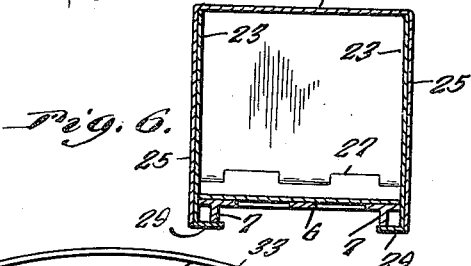
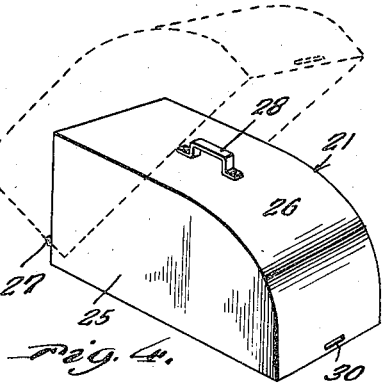
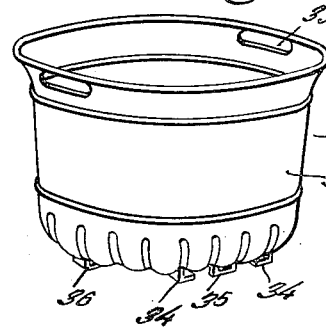
Inventors
Hugh McCann
Dick Busby
By Clarence A. O'Brien
and Hyman Berman
Attorneys Patented Jan. 28, 1941

2,229,756

UNITED STATES PATENT OFFICE 2,229,756

DELIVERY DEVICE FOR BICYCLES OR MOTORCYCLES

Hugh McCann and Dick Busby, Memphis, Tenn.

Application September 29, 1939, Serial No. 297,174

1 Claim. (Cl. 224—32)

This invention relates to a delivery device for bicycles or motorcycles whereby articles for delivery may be carried with safety and full protection from foreign matter and are easily accessible at the time of delivery.

The present invention has for its primary object, the provision of a device of the above stated character which may be easily and quickly installed on a motorcycle or bicycle without alteration to the latter and consists of a carrier frame of a novel construction and an article receptacle especially constructed for use with the carrier and which may not be removed from said carrier by an unauthorized person.

With these and other objects in view, the invention consists in certain novel features of construction, combination and arrangement of parts to be hereinafter more fully described and claimed.

For a complete understanding of our invention, reference is to be had to the following description and accompanying drawing, in which Figure 1 is a fragmentary side elevation illustrating a delivery device constructed in accordance with our invention and showing the application thereof to a bicycle.

Figure 2 is a side elevation illustrating the carrier frame.

Figure 3 is a top plan view illustrating the carrier frame.

Figure 4 is a perspective view illustrating an article receptacle wherein the cover thereof is shown in an open position by dotted lines.

Figure 5 is a vertical sectional view of the article receptacle.

Figure 6 is a transverse sectional view taken on the line 6—6 of Figure 5.

Figure 7 is a perspective view illustrating another form of article receptacle.

Referring in detail to the drawing, the numeral 5 indicates as an entirety a carrier frame which may be readily adapted to a bicycle, as clearly shown in Figure 1, or if desired, may be installed on a motorcycle in a like manner. The carrier frame includes a top plate 6 having depending flanges 7. Certain of the flanges 7 are arranged inwardly of the side edges of the top plate so that said edges act as guides. The depending flange at the end of the top plate is flush with the end edge thereof and carries a staple 8 to receive a padlock 9.

Substantially V-shaped frame members 10 are pivotally connected to the side flanges of the top plate adjacent the forward and rear ends of the top plate and have openings 11 in the apexes thereof for the purpose of receiving the spindles 12 of the hub 13 of a rear wheel 14 of a bicycle as indicated by the character 15 or the wheel may form a part of a motorcycle of the conventional construction. The V-shaped frame members 10 straddle the rear wheel positioning the top plate over the rear wheel mud-guard 16. Converging arms 17 are formed on the forward depending flange of the top plate and extend forwardly and downwardly and form an integral part of one section of an adjustable clamp 18. The sections of the clamp 18 are shaped to receive and grip the rear forks 19 of the bicycle. The carrier frame thus mounted on the bicycle is capable of carrying a maximum load without affecting the balance of the bicycle.

The top plate may have a series of openings 20 to form said top plate of skeleton formation so as to reduce the amount of material and weight of the carrier frame.

An article receptacle is indicated by the character 21 and includes a bottom wall 22 integral with upstanding side walls 23 and a cover 24 including side walls 25, a top wall 26 and an end wall which is hinged on the bottom wall 22, as shown at 27, which will permit the cover to be opened and closed as suggested by dotted lines in Figure 4, the cover having a handle 28 to facilitate the opening and closing of said cover. The side walls 25 of the cover are of a greater height than the side walls 23 carried by the bottom wall and the side walls 23 are bent at right angles, as shown at 29, to form guide channels to coact with the side edges of the top plate and the side flanges 7 in slidably securing the receptacle 21 onto the carrier frame. The top wall 26 has a curvature thereto which forms the front end wall, the vertical side walls 23 and 25 being cut-away to match the curvature of the top wall. The top wall adjacent its free end is provided with a slot 30 through which the staple 8 may extend prior to the application of the padlock to the staple.

A partition 31 is arranged within the receptacle and is carried by the bottom wall and coacts therewith and with the cover and the side walls in dividing the receptacle into compartments.

To apply the receptacle to the carrier frame, said receptacle is slid onto the top plate in a forward direction with the staple 8 passing through the slot 30. The staple passing through the slot will prevent the cover moving into an open position, also will secure the carrier against endwise movement on the carrier frame when the padlock 9 has been applied to the staple.

Thus it will be seen that it is impossible to remove the receptacle or open the latter when the padlock has been once applied to the staple, consequently preventing the theft of the receptacle or its contents.

Referring to our modified form of receptacle as shown in Figure 7 it is in the form of a basket 32 having hand slots 33. Channeled guides 34 are formed on the bottom of the basket 32 and also a plate 35 having a staple receiving slot. The basket 32 is further provided with supporting feet 36 to coact with the channeled guides 34 in supporting the receptacle or basket on a table or the like.

To apply the basket 32 to the carrier frame, the channeled guides 34 engage with the side edges of the top plate by sliding the receptacle onto said top plate in a forward direction until the staple 8 passes through the slot of the plate 35. After the application of the padlock to the staple the receptacle or basket 32 will be held against removal from the carrier frame.

It is believed that the foregoing description, when taken in connection with the drawing, will fully set forth the construction and advantages of this invention to those skilled in the art to which such device relates, so that further detailed description will not be required.

Having thus described our invention, what we claim is:

In a device of the character described, a carrier plate, parallel depending flanges on said plate and arranged inwardly of edges of the plate, a receptacle slidable on said plate and including vertical side walls and a bottom wall to rest on the plate and located in a plane above the lower edges of said side walls to permit the latter to depend below said plate with sliding contact therewith, flanges on the lower edges of the side walls and underlying the depending flanges, a cover for said receptacle and including a straight end wall hinged on the bottom wall of the receptacle and a top wall curved to form a second end wall having a slot and vertical side walls integral with the top and end walls to move over the vertical walls of the receptacle when the cover is positioned to close said receptacle, and a staple on said carrier plate to enter the slot to retain the cover in a closed position.

HUGH McCANN.
DICK BUSBY.